Patented Mar. 20, 1945

2,371,691

UNITED STATES PATENT OFFICE 2,371,691

PREPARATION OF QUINOLINIC ACID

Alfred T. Hawkinson and Arthur A. Elston, Niagara Falls, N. Y., assignors to E. I. du Pont de Nemours & Company, Wilmington, Del., a corporation of Delaware No Drawing. Application July 9, 1941,
Serial No. 401,674

8 Claims. (Cl. 260—295.5)

This invention relates to the preparation of heavymetal salts of quinolinic acid by the oxidation of quinoline or its derivatives. It is principally concerned with the preparation of copper salts of quinolinic acid by the oxidation of quinoline in the presence of an organic acid and a copper salt.

Nicotinic acid is a constituent of the vitamin B complex and is accordingly finding an expanded use in vitamin-enriched foodstuffs and in vitamin preparations intended for pharmaceutical purposes. Nicotinic acid is readily prepared from quinolinic acid, and for this reason a satisfactory and commercially efficient process for the preparation of quinolinic acid has become increasingly important. Our improved method involves the oxidation of quinoline with an inorganic peroxide under conditions such that the copper salt or salts of quinolinic acid are formed. The copper quinolinate thus resulting is readily converted to quinolinic acid by well-known methods, such for example as by treatment with hydrogen sulfide. Though valuable by itself for various purposes, quinolinic acid is also valuable as a convenient starting point for the manufacture of nicotinic acid and the vitamin B complex.

Stix and Bulgatsch have previously oxidized quinoline to copper quinolinate and quinolinic acid by treatment with an inorganic peroxide such as hydrogen peroxide. Their process involved oxidizing quinoline in sulfuric acid solution with 3% hydrogen peroxide, the oxidation being carried out in the presence of 1.4 moles of cupric sulfate. Temperature conditions within the range 60 to 70° C. were maintained and eleven hours or more were required for completion of the reaction. These chemists found that the presence of iron in the reaction mixture greatly decreases the yield of quinolinic acid. Their publications indicate that ordinarily yields of the order of 65 to 70% are secured, but that in the presence of even very small amounts of iron, percentages so low as to constitute mere traces of this metallic impurity, the yields of quinolinic acid in the form of its copper salt are reduced by as much as one half.

We have repeated the procedure of Stix and Bulgatsch, using both the chemically pure and U. S. P. grades of copper sulfate. Both high purity quinoline and the usual commercially available product have also been employed in the process. In all cases the reaction mixture was found to be highly contaminated with tarry by-products and the yield of quinolinic acid in the form of its copper salt was in all cases very low. The product was so contaminated with objectionable by-products that its purification in order to secure quinolinic acid of sufficiently high purity to permit its use in manufacturing products intended for pharmaceutical purposes was found economically impractical.

Moreover, the procedure of Stix and Bulgatsch in which the oxidation is carried out in the presence of sulfuric acid and copper sulfate was found to be difficult to start, heating for from 50 to 60 minutes being necessary in all cases before commencement of the reaction. Once started, the reaction was difficult to control. In addition to undue sensitivity to metallic impurities, which exerted an adverse catalytic effect even when present as traces, the process was also found to be highly sensitive to variations in acidity, concentrations of the reagents, and the temperature obtaining within the reaction vessel.

We have now found that quinoline may be readily oxidized to its copper salt or salts by oxidation with an inorganic peroxide in aqueous solution in the presence of an organic acid and the copper salt of an organic acid. Any organic acid or mixture of acids and the copper salt of any organic acid may be employed with equally satisfactory results. Generally we prefer to use acetic acid in the oxidation, principally because of its commercial availability and low cost, copper acetate being utilized as the copper salt. However, other organic acids such as formic acid, propionic acid, butyric acid, etc., as well as their copper salts, may be utilized in our process.

It is accordingly an object of this invention to produce copper quinolinate of high purity and in high yields by the oxidation of quinoline with a peroxide in the presence of an organic acid and the copper salt of an organic acid. A further object involves the utilization of quinoline and copper salts of a quality commercially available in the production of the heavy metal salt of quinolinic acid, the process being carried out under conditions such that the product is not contaminated with objectionable by-products. Moreover, still another object of this invention is the development of a process for preparing the copper salt of quinolinic acid by a process in which the conditions of temperature, acidity of the reaction mixture, and concentration of reagents are not unduly critical. In short, our principal aim is the development of a process for the preparation of quinolinic acid in the form of its copper salt which process is of general applicability and may be utilized under the widely varied circumstances which are commonly encountered in commercial manufacturing operations. These, as well as other objects of this invention, will be apparent from the ensuing disclosure of certain preferred embodiments thereof.

While our process is particularly suitable for preparing the copper salts of quinolinic acid from quinoline because of the commercial availability of quinoline, it is also suitable for preparing this acid in the form of its copper salt from quinoline derivatives. Accordingly, wherever in the ensuing disclosure reference is made to quinoline, it should be understood that this term is employed to include the various derivatives of quinoline which are equivalent to the latter material in our process. Derivatives of quinoline in which one or more of the hydrogen atoms of the carbocyclic ring have been replaced by other groups of radicals may, for example, be used in place of quinoline with substantially identical and equivalent results. The substituent groups may be alkyl groups, alkylene groups, hydroxy groups, keto, carboxylic, or sulfonic acid groups. As an illustration we may employ in our process 8-hydroxy quinoline, for example, in place of quinoline with exactly equivalent results. Other suitable quinoline derivatives are, for instance, quinoline-8-sulfonic acid, 5, 6, 7, or 8-methyl-quinoline, etc. Derivatives of quinoline in which the carbocyclic ring has been partially or completely hydrogenated, with or without substitution of one or more of the hydrogen atoms by the previously mentioned groups, may also be utilized. Among such compounds are, for example, dihydroquinoline and dihydrodiketoquinoline. Derivatives of quinoline containing groups in the heterocyclic ring may also be used, in which case substituted quinolinic acids are obtained.

In our improved method for oxidizing quinoline to quinolinic acid in the form of its copper salt the quinoline or quinoline derivative is first dissolved in water with a sufficient amount of the particular organic acid selected to form a salt of quinoline and to render the quinoline substantially completely soluble therein. There is then added to the quinoline solution a solution of the copper (cupric) salt of the organic acid selected, the amount of cupric salt added for best results being at least that which will supply the stoichiometric amount of copper with reference to the amount of quinoline or quinoline derivative used. The copper-quinoline salt solution is then maintained at a temperature preferably within the range 20–80° C. and the inorganic peroxide oxidizing agent added thereto. Generally the amount of peroxide added will be at least equivalent to the stoichiometric amount, and it should preferably be added at such a rate that the temperature is not raised above the maximum temperature to be maintained in the reaction mixture. During this period the temperature is controlled until substantially all of the peroxide has been consumed, the insoluble copper quinolinate appearing as a precipitate in the reaction mixture. The copper salt or salts of quinolinic acid is then filtered off and washed. Generally the copper quinolinate will have the following constitution (the dihydrate),

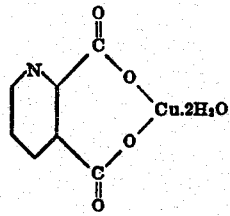

although other copper salts may also be formed.

In commercial operations it is desirable to keep the concentrations of the materials as high as possible in order to reduce cost of labor and utilities. We have carried out the oxidation of quinoline in accordance with our process, using as little as one part of quinoline and 2.2 parts of the copper salt of organic acid, all dissolved in 13.5 parts of water (all parts are by weight). On the other hand the reaction may be carried out with equally satisfactory results using more than six times as much water (81 parts). Generally we prefer to carry out the oxidation using solutions of one part of quinoline in forty to forty-five parts of water, but the oxidation may be carried out effectively in as little as six to seven parts of water per part of quinoline. The oxidation is exothermic and the temperature rise will therefore be greater in the more concentrated solutions than in more dilute solutions. When the oxidation is carried out at higher temperatures we prefer to employ dilute solutions in order to avoid overheating. At the lower temperatures more concentrated solutions may be utilized without overheating. The process may be efficiently carried out over a very wide range of conditions such as concentration of the reagents, acidity of the reaction mixture, temperatures maintained, and the proportions of the reactants.

When utilizing our preferred organic acid, acetic acid, and copper acetate, we have found that a smooth, rapid oxidation takes place resulting in a high yield of substantially pure copper quinolinate. This oxidizing activity of the inorganic peroxide in the presence of an organic acid and the copper salt of an organic acid is in marked contrast to its behavior in the presence of mineral acids and their copper salts. When quinoline is oxidized with an inorganic peroxide in the presence of sulfuric, phosphoric, nitric, or hydrochloric acids and their corresponding cupric salts, we have observed that there results only a low yield of a product of very low purity. Commonly both low yields and highly impure products are obtained, the products being generally so impure that it is very difficult to secure commercially valuable products. When the oxidation is carried out in the presence of an organic acid such, for example, as acetic acid, and in the presence of a copper salt such as cupric acetate, the resulting product of high yield is of such a high degree of purity that for most uses purification is either very simple or may not be required at all.

The amount of organic acid employed in carrying out our improved process for the oxidation of quinoline may be varied within relatively wide limits without appreciably affecting the results obtained. Amounts of acid sufficient only to form the soluble quinoline salt may be utilized with good results, while on the other hand we have employed as much as ten times that amount to secure equally satisfactory yields of a product of high purity. Generally we prefer to utilize about three times the amount of acid required to form the quinoline salt, using for example three parts of glacial acetic acid for each two parts of quinoline. These parts are by weight, and amounts of the order specified insure complete solubility of the reagents.

The proportion of copper salt utilized may also be varied to a considerable degree. Generally we prefer to utilize about 1.4 moles of copper salt for each mole of quinoline oxidized. This ratio may, however, be varied from less than one mole of copper per mole of quinoline to several moles of copper per mole of quinoline. The use of a large excess of copper salt is not particularly desirable from the economic viewpoint, although such an excess has no effect on either the yield or quality of the product. If the amount of copper is reduced below approximately one mole per mole of quinoline, however, the yield of copper quinolinate is in direct proportion to the amount of copper employed. Since a copper salt when dissolved in an organic acid is in the form of the salt of that acid, the copper need not, of course, be added as the salt of an organic acid, but may be added as the oxide or hydroxide.

Temperatures within the range 20 to 80° C. may be employed with entire success. The oxidation proceeds more slowly at a temperature of 20 to 30° C. than at the higher temperatures, but the reaction is complete at any temperature within the specified range. In general we prefer to carry out the reaction at temperatures of 30 to 45° C. Ordinarily the solution is first maintained at 30° C. and the temperature is allowed to rise as heat is evolved to about 45° C. The temperature is then maintained within the range 30 to 45° C. by varying the rate of peroxide addition. In this way a product of high quality is insured.

As the inorganic peroxide we generally prefer to utilize hydrogen peroxide in the form of its 100 volume solution (27.6% $H_2O_2$ by weight) as commercially supplied to the trade, for example under the trade-mark name "Albone." The use of this concentrated peroxide solution permits carrying out the reaction in solutions of higher concentration. However, hydrogen peroxide solutions of lower or higher concentration, such as for example as 3 volume solutions, 25 volume solutions, 130 volume solutions, 150 volume solutions, or 200 volume solutions are equally suitable. It may be remarked that the volume concentration of a solution of a peroxygen compound constitutes a convenient way of expressing the concentration of peroxide therein, and is defined as the number of volumes of oxygen gas, measured at 0° C. and 760 millimeters of mercury pressure, which would be evolved, upon complete decomposition, from one volume of the solution maintained at 20° C.

In the acid solution in which the oxidation of quinoline is carried out in accordance with our improved process, generally any other inorganic peroxide or peroxygen compound is the equivalent of hydrogen peroxide. Since in the solution of acidic reaction which is employed these agents are the equivalent of hydrogen peroxide and act as a peroxide, throughout both specification and claims the term "peroxide" is employed to include all agents functioning as such in our process. Where a solution of hydrogen peroxide is prepared by treating an inorganic or organic peroxide with an acid prior to the introduction of the peroxide into the reaction mixture, it should be noted that the use of acids such as sulfuric acid, nitric acid, and phosphoric acid as neutralizing agents should be avoided, in view of the detrimental qualities of these acid anions when present in our reaction mixture.

The oxidation may be efficiently carried out using the peroxide in approximately 30% excess in order to insure the presence of sufficient of the oxidizing agent to oxidize the quinoline completely. The use of less peroxide than the theoretical amount required to oxidize quinoline to quinolinic acid, i. e., nine moles of peroxide to one of quinoline, of course will not affect the complete oxidation of the quinoline but will reduce the amount of quinoline oxidized. Generally a slight excess of peroxide over the theoretical amount required is necessary to make up for losses of peroxide due to its decomposition in the presence of copper salts. In commercial methods the actual excess of peroxide required will vary slightly with the conditions employed within the range up to a 30% excess. The use of larger excess amounts of peroxide will not result in an increased yield and will only be economically wasteful.

The reagents utilized in our process may be placed in the solution in any convenient order without appreciably affecting the yield or quality of the resulting products. We generally prefer to add the peroxide to the solution of the other raw materials last, because the rate at which it is added provides a convenient means of controlling the rate at which the reaction proceeds. As previously pointed out, by controlling the rate at which the reaction proceeds it is possible to maintain the temperature conditions within any desired temperature range. The reaction may of course be controlled by other means, such as by heating or cooling, controlling the rate of addition of the quinoline, rate of adding the organic copper salt, by adding diluting water, or by providing for the circulation of cooling water or some other cooling means.

As an example of our improved procedure for the oxidation of quinoline to quinolinic acid in the form of copper quinolinate, the following may be given.

*Example*

Copper acetate monohydrate,

$Cu(CH_3COO)_2.H_2O$ in the amount of 26 parts was dissolved in 500 parts of water. Quinoline in the amount of 12 parts was then dissolved in 18 parts of glacial acetic acid and the solution added to the solution of copper salt. The resulting copper acetate-quinoline solution was heated to 60° C., whereupon 100 volume hydrogen peroxide solution in the amount of 137.5 parts was added with continued agitation. The addition of the peroxide was carried out at such a rate that the temperature of the solution did not go above 70° C. All parts specified are by weight.

After the last of the peroxide solution had been added, the temperature was maintained within the range 60 to 70° C. until the evolution of gas ceased. The blue precipitate of copper quinolinate was then filtered off, washed, and dried. The resulting yield constituted seventeen parts by weight of copper quinolinate dihydrate.

As a modification of this procedure, a solution of 100 volume hydrogen peroxide was added at such a rate that the temperature of the reaction mixture did not go above 45° C. After all the peroxide had been added, the solution was allowed to stand at room temperature for twenty-four hours. The precipitated blue salt of copper quinolinate was then filtered off and the yield of copper quinolinate dihyrate, substantially 17 parts by weight, was substantially the same as that secured under the higher temperature conditions.

Among advantages of our improved process for preparing quinolinic acid in the form of its copper salt from quinoline and its various derivatives, we may specifically mention the fact that the copper quinolinate is of high purity and is prepared in high yields. Moreover, no insoluble residues which are difficult to remove by filtration result. In this way handling of the reaction mixture is reduced to a minimum. It may be remarked that when quinoline is oxidized by means of permanganates such insoluble residues are generally present in the reaction mixture.

The possibility of carrying out the reaction with relatively low volumes of liquid, as well as under a wide range of conditions as regards temperature and acidity, also constitute advantages important in commercial methods wherein the handling of large volumes of liquids adds to the expense of the process. Moreover, the reaction begins immediately in our improved method, and the overall time required for complete oxidation is considerably less than that required in other processes. Undue sensitivity to metallic impurities exerting undesirable catalytic effects is not experienced in our improved method, while its flexibility and the fact that it is not necessary to maintain conditions within very narrow limits, such for example as are necessary in other processes, add considerably to the commercial attractiveness of our method.

It should be understood that various changes may be made in our process as herein described without affecting the improved results obtainable. Thus, various modifications in conditions as to time, temperature, acidity, and various changes in procedure differing from those herein described as illustrative of the preferred embodiments of our invention, might be made without departing from the scope thereof. Accordingly, the purview of our invention is to be determined in accordance with the prior art and appended claims.

We claim:

1. The method of preparing copper quinolinate which comprises oxidizing quinoline with a peroxide in the presence of a lower aliphatic carboxylic acid and the copper salt of a lower aliphatic carboxylic acid.

2. The method of preparing copper quinolinate which comprises oxidizing quinoline with a peroxide in an aqueous solution comprising a lower aliphatic carboxylic acid and the copper salt of a lower aliphatic carboxylic acid.

3. The method of preparing copper quinolinate which comprises oxidizing quinoline with a peroxide, said quinoline being dissolved in an aqueous solution of a lower aliphatic carboxylic acid, said aqueous solution containing dissolved therein a copper salt.

4. The method of preparing copper quinolinate which comprises oxidizing quinoline with an inorganic peroxide in an aqueous solution comprising a lower aliphatic carboxylic acid and the copper salt of a lower aliphatic carboxylic acid.

5. The method of preparing copper quinolinate which comprises oxidizing quinoline with hydrogen peroxide, said oxidation being carried out in an aqueous solution comprising a lower aliphatic carboxylic acid and the copper salt thereof.

6. The method of preparing copper quinolinate which comprises oxidizing quinoline with hydrogen peroxide in an aqueous solution containing acetic acid and copper acetate.

7. The method of preparing copper quinolinate which comprises oxidizing quinoline with hydrogen peroxide in an aqueous solution containing formic acid and copper formate.

8. The method of preparing copper quinolinate which comprises oxidizing quinoline with hydrogen peroxide in an aqueous solution containing propionic acid and copper propionate.

ALFRED T. HAWKINSON.
ARTHUR A. ELSTON.